United States Patent Office 3,432,000
Patented Mar. 11, 1969

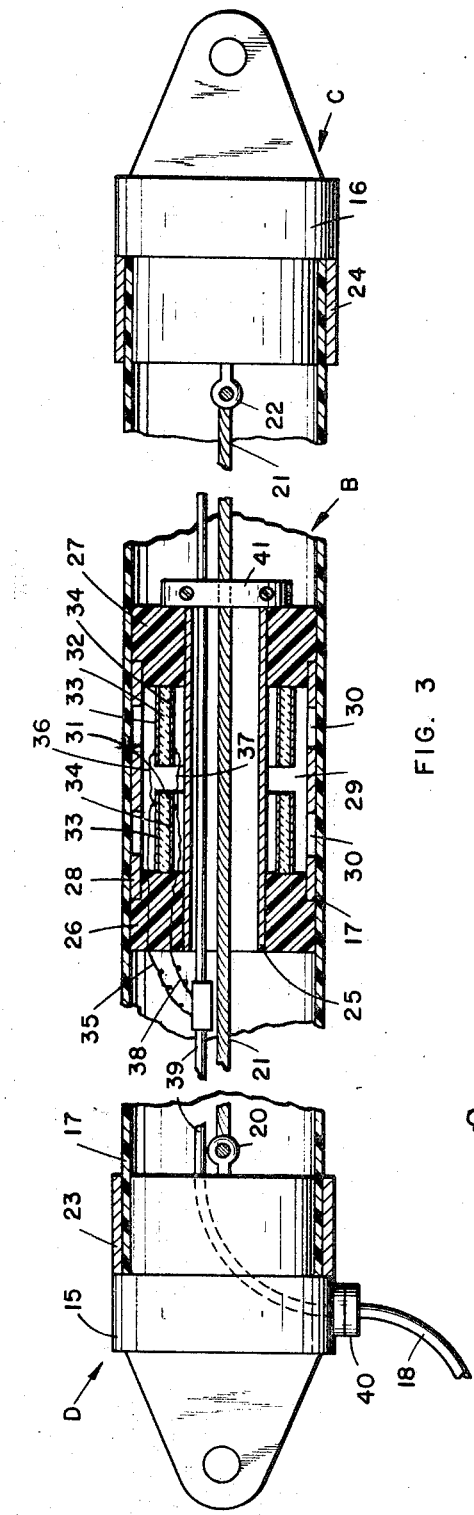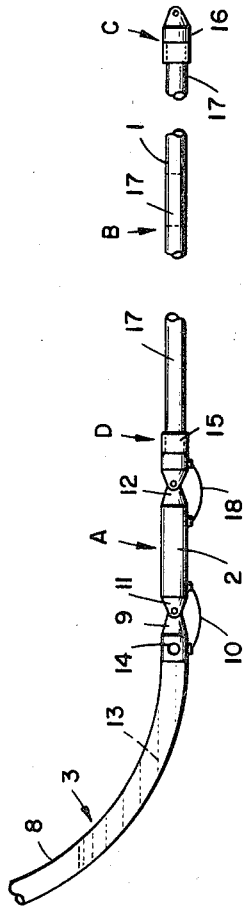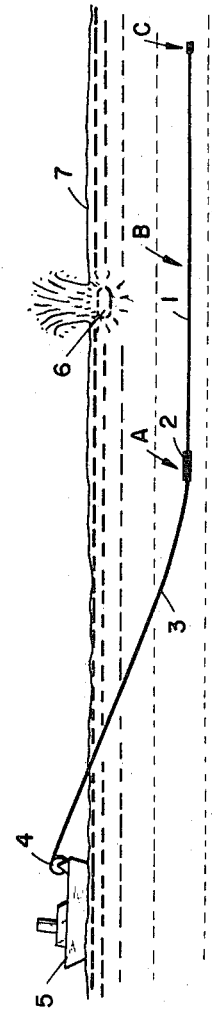
INVENTORS:
LEO ONGKIEHONG
HARM MAST

3,432,000
SUBMERSIBLE DETECTOR FOR SENSING UNDERWATER SOUNDS
Leo Ongkiehong and Harm Mast, Rijswijk, Netherlands, assignors to Shell Oil Company, New York, N.Y., a corporation of Delaware
Filed Mar. 21, 1967, Ser. No. 624,817
Claims priority, application Great Britain, Mar. 25, 1966, 13,489/66
U.S. Cl. 181—.5
Int. Cl. G01v 1/38
3 Claims

ABSTRACT OF THE DISCLOSURE

In a liquid filled, flexible streamer carrying underwater seismic exploration hydrophones, the sound pressure wave detectors may be isolated from the false inertial forces that result when the mass of the liquid filling the streamer is shifted or accelerated by disposing the detectors in fluid-tight chambers having a rigid wall between the liquid filled interior of the streamer and the pressure detector containing interior of said chambers. Sensitivity to seismic sonic waves is retained by arranging the pressure detector containing chambers to include a portion of the flexible streamer casing as one wall thereof and filling the chamber with liquid in direct contact with both, the interior surface of the flexible streamer casing and the surface of the pressure detector, so that the flexible casing wall acts as a diaphragm to transmit sonic pressure waves directed against the outer surface of the casing directly to the pressure detector via the chamber liquid.

---

The present invention relates to a submersible detector for detecting underwater sounds, and in particular to a so-called "submersible streamer" carrying a number of hydrophones for use in seismic prospecting operations.

In these operations, a shock wave is created in a body of water overlying the earth formations, certain properties of which, such as depth and inclination, it is very desirable to have knowledge of in the search for valuable minerals such as oil. The shock wave may be created either by an explosion such as of a gaseous mixture or of a solid material, or by an electric spark or by any other means suitable for the purpose. The shock wave travels in all directions, and part of its energy is returned to the surface after being reflected or refracted by the formations lying below the body of water. The reflected or refracted waves which return from the formations vary the pressure in the body of water and are detected on traveling through this body of water in order to ascertain their amplitude and their sequence of returning. Such detection can now be made by a "submerged streamer" comprising pressure detectors which are arranged in a liquid-filled flexible tube of the type described in U.S. Patent 2,465,696.

The streamer in said U.S. patent is preferably towed through the water at a desired depth, suitable conducting elements being applied for transmitting the information obtained from the pressure detectors to a tow-boat, on board of which the total amount of information is compiled into a seismogram. Although in theory a single pressure detector would be sufficient for the purpose, in practice several detectors are preferably applied in order to obtain greater accuracy of the measuring results.

The streamer or submersible detector for detecting underwater sounds consists for the greater part of a liquid- (preferably oil-) filled tube, which tube is provided with means suitable for connecting the tube (which is closed at both ends) to a boat adapted to tow the tube through the water in a stretched position. Suitable reinforcements, such as cables extending in axial direction through the tube, may be applied if the mechanical strength of the tube material is insufficient to withstand the forces exerted thereon by the tow-boat.

If the specific gravity of the liquid is suitably chosen, this streamer will have an overall specific gravity which equals the specific gravity of the water in which it is being operated, and consequently a neutral buoyancy in this water.

Reinforcement of the tube in the radial direction is not required, since the pressure inside the liquid-filled tube will be equalized to the pressure outside the tube by small changes in the volume enclosed by the flexible wall of the tube.

The geologically significant pressure waves returning from the formations below the body of water are transmitted through the flexible tube wall and the liquid contained therein to the pressure detectors mounted within the tube interior without appreciable delay or energy loss. The force variations consequent of such pressure waves are sensed by the pressure detectors and proportional electrical signals are transmitted as useful information to the tow boat where it is received by appropriate equipment to be incorporated into a seismogram. However, due to the acceleration and deceleration of the mass of the liquid column within the tube, irrelevant and geologically insignificant pressure waves are generated within the tube to be sensed by the pressure detectors and ultimately incorporated with the significant information into the seismogram, thereby decreasing the quality thereof to an undesirable extent.

It may be remarked in this connection that submersible streamers consisting of a flexible tube without liquid contained therein do not suffer from pressure variations resulting from acceleration and deceleration of a liquid column contained in the tube and acting on the pressure detectors. Such streamers are described in U.S. Patents 2,772,405 and 2,791,757. In these known constructions the detectors are located against the inner wall of the flexible tube for sensing the pressure variations in the liquid outside the tube. Since the tube must withstand the outside hydrostatic pressure acting thereon, while being supported only by a helical spring, the wall of the tube has to be rather thick, which adversely affects the sensitivity of the pressure detectors. Moreover, the pressure detector, which is a piezoelectric crystal, is supported at its ends only and has to be of an appreciable thickness to withstand the hydrostatic pressure acting on the outside thereof. Consequently, the crystals to be used in such constructions are expensive.

The object of the present invention is a submersible detector for underwater sounds in which the detection of undesired pressure variations is suppressed.

According to the present invention, therefore, a submersible detector for detecting underwater sounds comprises a liquid-filled flexible tube, in which tube at least one liquid-filled chamber is arranged, this chamber having rigid walls with the exception of one wall of which at least part is formed by the tube wall made of flexible material, and containing at least one pressure detector, a liquid-tight seal being arranged between the liquid-filled interior of the tube and the liquid-filled chamber.

Preferably, the chamber enclosing the pressure detector is bounded by at least two axially displaced members which are sealed in a liquid-tight manner at their circumferential edges to the inner surface of the flexible wall of the tube.

The pressure detectors may be formed by piezoelectric crystals. Preferably, each pressure detector comprises two piezoelectric crystals which are axially displaced with relation to each other and mounted on opposing planes.

The details of our invention will be further described with reference to the drawings wherein:

FIGURE 1 is a schematic elevational view showing a streamer according to the present invention when towed through a body of water;

FIGURE 2 is a view of portions A, B and C of the streamer indicated in FIGURE 1 but at a greater scale than that of FIGURE 1; and FIGURE 3 is a longitudinal sectional view of portions B, C and D of FIGURE 2 drawn at a greater scale than that of FIGURE 2.

The streamer 1 is, as shown in FIGURE 1, connected via a body 2 to a towing member 3. This member 3 is of a flexible nature, and is connected at its leading end to a rotatable drum 4 carried by a tow-boat 5. By rotating this drum 4 in one direction, the member 3, the body 2 and the streamer 1 can be stored thereon. Rotation in another direction pays out more length of the member 3. The boat 5 also carries the equipment necessary for storing the information obtained from the pressure detectors carried by the streamer 1. Furthermore, the boat 5 may be provided with equipment for creating the seismic shock waves. This equipment is only schematically shown in the drawing by the dynamite charge 6 exploding below the water level 7, but it will be understood that any other type of equipment, such as means for exploding gas mixtures below the water level or electric sparkers, may be applied for this purpose.

With reference to FIGURE 2, the towing member 3 consists of a flexible tube 8 which may be manufactured of material that is sufficiently strong to transmit the towing force from the boat 5 to the streamer 1, or is reinforced by one or more cables (not shown), which are at the trailing end thereof connected to the coupling element 9 of the tube 8. Suitably insulated electric conduits are passed through the flexible tube 8 (or embedded in the wall thereof), which conduits are at one end connected to recording equipment carried by the boat 5 for recording the information obtained from the pressure detectors carried by the streamer 1. The other ends of these electric conduits 10 are passed into the body 2, which preferably consists of a hollow cylindrical metal element provided with coupling elements 11, 12, at the ends thereof. This body 2, which is coupled with element 11 thereof to the coupling element 9 of the towing member 3, carries in a liquid-tight manner an electric amplifier, to the output of which the electric conduits 10 are connected.

As shown in FIGURE 2, the tube 8 of the towing member 3 is partially filled with water 13, which water is in communication via a passage 14 with the body of water in which the element 3 is submerged. This passage 14 is, as shown, arranged through the body of the coupling element 9 which is connected to the trailing end of the towing member 3. It will be obvious that the passage 14 may also be arranged in the wall of the tube 8. By varying the pressure of the air in the tube 8 above the water column 13 contained therein, the amount of water, and consequently the depth to which the trailing end of the tube is submerged, can be varied. The weight and volume of the assembly comprising the body 2 and the streamer 1 are so chosen that the specific gravity thereof equals the specific gravity of the water in which the assembly is submerged. Consequently, the assembly will swim in the water at a depth which is controlled by the gas pressure which is maintained from the boat 5 in the tube 8. A suitable source of pressure (not shown) is available on board the boat 5 for this purpose.

The streamer 1 is, as shown in FIGURE 2, provided with a coupling element 15 at the leading end thereof, which coupling element can be coupled to element 12 of body 2. The trailing end of the streamer 1 is provided with a coupling element 16, which may be used for coupling other streamers (not shown) to the streamer 1. The coupling elements 15 and 16 close the ends of a flexible tube 17 of the streamer 1 in a liquid-tight manner, as will be further described with reference to FIGURE 3.

Electric conduits 18 are provided, which are at one side thereof connected to the input of the amplifier carried by the body 2, and at the other side to electric circuits carried by the streamer 1. These conduits 18, as well as the conduits 10, are suitably insulated and pass through the relevant coupling elements in a liquid-tight manner so as to prevent the entry of water into the body 2. The coupling elements for coupling and decoupling the electric conduits 10 and 18 to the electric circuits carried by the body 2 and the streamer 1, respectively, are of the liquid-tight type.

Details of the streamer 1 are shown in FIGURE 3, in which parts D and C show the leading end and the trailing end of streamer 1, respectively. Part B is a longitudinal section over a pressure detector, which is carried within the flexible tube 17 together with a number of other pressure detectors (not shown) of the same design.

The tube 17 is made of a flexible material, such as plastic material. The interior of the tube is filled with a liquid, such as oil.

No further support of the wall of the tube 17 is then required, as the pressure in its interior will always be equal to the pressure on the outside thereof, since the flexibility of the tube wall allows the minute volume changes which are required for varying the pressure of the liquid inside the tube.

The leading end D of the tube 17 is closed off by the coupling element 15 which is provided with a hole 19, through which a pin (not shown) can be inserted to couple this element to the element 12 of the body 2. An eye bolt 20 is arranged on the coupling 15 for connecting a cable 21 to element 15, which cable runs through the tube 17 and is connected to an eye bolt 22 arranged on the coupling element 16 which closes off the trailing end C of the tube 17. The cable 21 is applied for reducing the towing force exerted on the tube 17, as well as for inserting the pressure detectors into their desired positions within the tube 17, as will be explained hereinafter. Clamping members 23 and 24, which may be of any type suitable for the purpose, are applied for connecting the ends of the tube 17 to the coupling elements 15 and 16, respectively.

One of the pressure detectors carried by the flexible tube 17 is shown in part B of FIGURE 3. On a cylindrical tube 25, two cylindrical end pieces 26, 27 are mounted in a liquid-tight manner. A grid-like member 28 is arranged between the end pieces 26 and 27, thereby enclosing, in combination with the tube 25 and the end pieces 26, 27, an annular chamber 29. The construction of the chamber forming elements 25, 26, 27 and 28 is such that a rigid unit is formed, which will not change the internal volume of the enclosed chamber 29 when the tube 17 in which the chamber 29 is located is being bent. The elements 25, 26, 27 and 28 may be connected in any manner suitable to obtain a rigid unit. The elements may be made of metal or any other material suitable for the purpose. If desired, the elements 25 and 28 may be made of metal, whereas the elements 26 and 27 are made of an electric insulating material such as synthetic resin, e.g., nylon.

The outer diameter of the end pieces 26, 27 is slightly greater than the inner diameter of the tube 17, such that the end pieces 26 and 27 can only be pushed through the tube provided that some force is exerted. The contact between the circumferential wall of the end pieces 26 and 27 and the inner wall of the tube 17 is such that a liquid-tight seal is formed therebetween, which seal is tight against liquid pressures of several atmospheres prevailing across said seal.

The outer diameter of the grid 28 is equal to or somewhat smaller than the inner diameter of the tube 17. The openings 30 of the grid 28 are covered by the flexible wall of the tube 17.

The chamber 29 is filled with liquid, which liquid may be the same as the liquid which is contained within the tube 17. Since, however, the circumferential edges of the end pieces 26 and 27 are liquid tightly pressed against the inner wall of the tube 17, there is no communication between the liquid filling the interior of tube 17 and the liquid filling the chamber 29. Since, further, the elements 25, 26, 27 form a rigid unit acting as a boundary between the interior of the tube 17 and the chamber 29, pressure variations occurring within the liquid filling the interior of the tube 17 will not be transferred to the liquid filling the interior of the chamber 29. Only pressure variations occcurring in the liquid outside the tube 17 will be passed on to the liquid filling the chamber 29, since part of the wall separating these two spaces is formed by those parts of the flexible wall of the tube 17, which cover the openings 30 in the grid 28 and act as pressure wave transmitting diaphragms.

In the chamber 29, two piezoelectric crystals 31 and 32 are mounted in a suitable manner, such as by means of an adhesive, on opposite planes forming part of the end pieces 26 and 27, respectively, which are of an electrically insulating material. These crystals consist of barium titanate or any other piezoelectric material in the form of a hollow cylinder having the inner surface and the outer surface thereof covered with a thin layer of silver 33 and 34, respectively, to which electric conducting wires 35, 36, 37, 38 are soldered as indicated. The crystals may, however, if desired, be switched in series. The wires 35 and 38 form part of the electric conduit 39 passing through the flexible tube 17, and are connected via cable 18 (FIGURE 2) to the amplifier contained in body 2. A liquid-tight connecting unit 40 is arranged between cable 18 and conduit 39.

For pulling the pressure detectors through the tube 17 by means of the cable 21 so as to insert them at the desired place within the tube 17, the cable 21 is provided with clamps, one of which is shown and indicated with reference numeral 41, which clamp consists of two members screwed together by screws and clamping the cable 21 therebetween. The dimensions of the clamps are so chosen that the clamps cannot pass through the interior of tube 25 of each pressure detector, but do not close off the passage therethrough.

The operation of the submersible streamer according to the invention is as follows.

The streamer 1 is is wound off from the rotatable drum 4 when the boat 5 is on the spot where the properties of formations located below the water have to be measured. By proceeding slowly, the streamer 1, the body 2 and part of the flexible towing member 3 are submerged in the body of water as shown in FIGURE 1 of the drawing. By controlling the air pressure in the interior of the flexible towing member 3, the level of the liquid column 13 inside this member 3, and consequently the depth at which the streamer 1 lies, can be varied at will. Before the streamer 1 and the body 2 are put into the water, the buoyancy thereof in the water has been made neutral by a suitable selection of the liquid contained with the tube 17 and/or by adding or removing ballast weight from the body 2.

The streamer 1 being paid out in the water as shown, the boat 5 slowly progresses along a predetermined path, and dynamite charges 6 are periodically exploded. The shock wave created by each explosion passes through the body of water, thereby raising the pressure of the water at the places where the wave passes. On passing along the pressure recorders which measure the pressure of the water at the depth at which the streamer 1 has been submerged, the shock wave increases the pressure acting on the pressure recorders, which measurement is passed on via the amplifier in body 2 to the recording equipment carried by the boat 5. Since this information is not of interest, the pressure recorders are preferably switched off during the passage of this shock wave. The shock wave, traveling in all directions, passes into the formations lying below the body of water in which the measurements are being carried out, and is partly reflected (or refracted) by the boundary planes of adjacent formation layers. The reflected (or refracted) waves are returned in an upward direction, thereby passing out of the formations and entering the body of water, in which they travel past the streamer 1, raising the pressure outside the flexible tube 17. This pressure rise is transmitted to the liquid contained in the chamber 29 via those parts of the wall of the tube 17, where this flexible wall covers the openings 30 of the grid 28, and consequently acts on the piezoelectric crystals 31 and 32 which are enclosed by this liquid. This raises a potential difference across the silver layers 33, 34 of each crystal, which potential differences of both crystals are transmitted via the circuits 35, 36, 37, 38 the conduit 39, the coupling 40 and the conduit 18 to the amplifier carried by the body 2. After being amplified, the signal is further transmitted via electrical conduit 10 to the recording equipment on board the boat 5.

By the arrangement of the piezoelectric crystals in the liquid-filled space 29, which space is sealed off from the liquid-filled parts of the flexible tube 17, the amount of noise which is measured simultaneously with the returning waves is considerably decreased. In the prior art constructions in which the pressure detectors are mounted in the liquid column present in the tube, this noise originates from the pressure variations occurring in the liquid column from the acceleration and deceleration of this column due to jerks exerted on the tube by the towboat 5, and from the volume changes of the interior volume of the tube 17 resulting from the wiggling and bending movements of the tube 17 when being towed through the water. These pressure variations are picked up by the pressure detectors simultaneously with the returning shock waves, the latter of which are thus deformed to an unknown extent, and are consequently not representative for the formation properties which are being measured.

In the present streamer, however, any variation in pressure of the liquid column in the tube 17 is prevented from being transmitted to the liquid present within the chamber 29 of each pressure detector, since the walls of the chamber 29 are, with the exception of the one which is at least partially formed by the flexible wall of the tube 17, of a rigid nature, and, further, no liquid passage exists between the liquid column within the tube 17 and the liquid within the chamber 29 of each pressure detector.

Furthermore, the bending movements of the streamer do not affect the internal volume of the chamber 29 due to the rigid nature of the enclosing walls thereof, and thus do not create pressure variations within the liquid in the chamber 29. Due to the short length of the chamber 29, the pressure variations in the liquid contained therein resulting from acceleration and deceleration of the streamer, are negligible.

It will be clear that the embodiment of the invention as described with reference to the drawing is given by way of example only. Many modifications will be possible therein, without departing from the invention. Such modifications may exist, for example, in the application of other types of couplings 9, 11, 12, 15, 16 and 40 as shown in the drawing. Care should be taken, however, to insure that the walls of the chamber 29 are always of a rigid nature, with the exception of the one which is at least partially formed by the flexible wall of the tube 17, and that there is a liquid-tight seal between the interior of the chamber 29 and the exterior thereof.

The arrangement of the piezoelectric crystals 31, 32 in the chamber 29 on opposing walls thereof, which crystals are switched either parallel or in series, further aids in the suppression of deformations occurring in the measurement of the shock waves returning from the formations lying below the body of water. This arrangement equalizes the voltage changes generated by the crystals as a result of accelerations and decelerations of the masses of these crystals, which accompany the jerks exerted by the tow-boat 5 on the streamer 1.

We claim:
1. An apparatus for detecting underwater sounds comprising:
water submersible, liquid filled, elongated flexible tube means;
a plurality of chamber means within and longitudinally spaced along said tube means, said chamber means being defined by bulkhead means, said bulkhead means for each of said plurality of chamber means comprising first and second wall means, disposed transversely across said tube means interior and substantially normal to the axis thereof, the outer periphery of said first and second wall means being in fluid tight contact with the interior wall surface of said tube means;
pressure detector means disposed within said chamber means for sensing sonic pressure waves inpinging against the chamber wall portion of said tube means, said pressure detector means comprising two hollow cylinder shaped piezoelectric crystals each crystal having one axial end secured to a respective one of oppositely facing surfaces of said first and second wall means; and
fluid means substantially filling the residual space within said chamber means.
2. Apparatus as described by claim 1 wherein said crystals are connected in electrical parallel circuit.
3. Apparatus as described by claim 1 wherein said crystals are connected in electrical series circuit.

References Cited
UNITED STATES PATENTS

| | | |
|---|---|---|
| 2,694,868 | 11/1954 | McMillan et al. |
| 2,791,757 | 5/1957 | Blake et al. _____ 340—7 |
| 2,923,916 | 2/1960 | Woodworth _____ 340—17 |
| 3,290,645 | 12/1966 | Pavey et al. _____ 340—7 |
| 3,332,057 | 7/1967 | Pavey _____ 340—17 |

BENJAMIN A. BORCHELT, *Primary Examiner.*

JAMES FOX, *Assistant Examiner.*

U.S. Cl. X.R.

340—7, 10